D. O. FOSGATE.
Sulky-Plow.

No. 211,724. Patented Jan. 28, 1879.

WITNESSES:
C. Neveux
C. Sedgwick

INVENTOR:
D. O. Fosgate
BY Munn & Co
ATTORNEYS.

UNITED STATES PATENT OFFICE.

DANIEL O. FOSGATE, OF ROCHESTER, MINNESOTA.

IMPROVEMENT IN SULKY-PLOWS.

Specification forming part of Letters Patent No. 211,724, dated January 28, 1879; application filed November 15, 1878.

*To all whom it may concern:*

Figure 1:
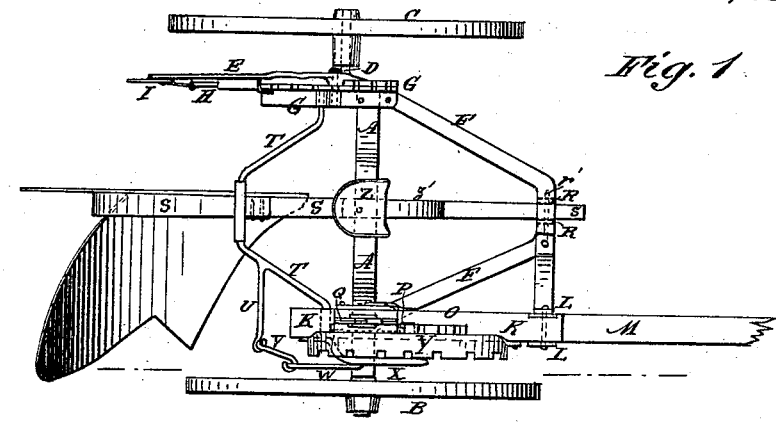
Figure 2:
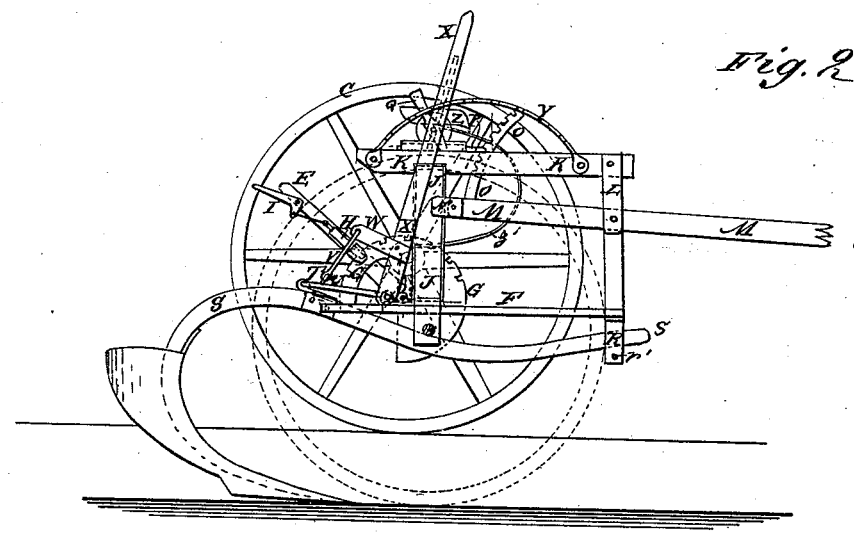
Figures 3, 4:
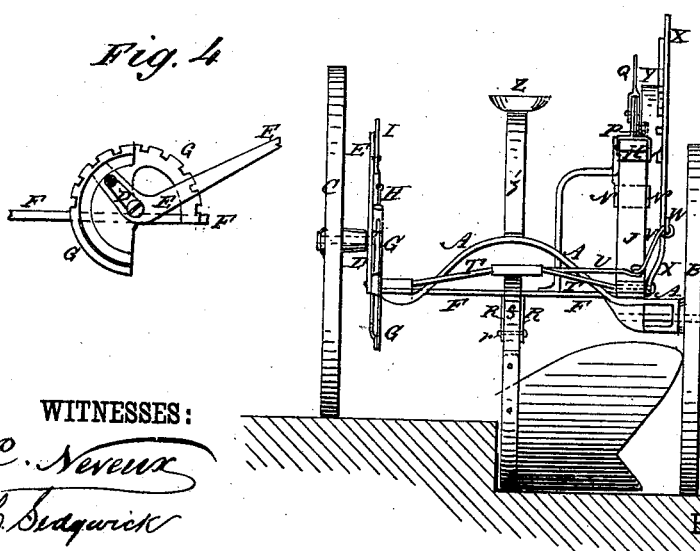

Be it known that I, DANIEL O. FOSGATE, of Rochester, in the county of Olmsted and State of Minnesota, have invented a new and useful Improvement in Sulky-Plows, of which the following is a specification:

Figure 1 is a top view of my improved sulky-plow. Fig. 2 is a side view of the same, the furrow-wheel being removed. Fig. 3 is a rear view of the same. Fig. 4 is a detail view of the device for adjusting the movable wheel.

Similar letters of reference indicate corresponding parts.

The object of this invention is to furnish sulky-plows which shall be simple in construction, convenient in use, light, strong, and durable, and which shall be of light draft and easily controlled, being so constructed that the frame may be leveled and the plow raised from and lowered to the ground by the driver from his seat.

A represents the sulky-axle, the middle part of which is arched to form a space for the plow-beam. B is the furrow-wheel, which revolves upon a journal formed upon or rigidly connected with the end of the axle A. C is the wheel that runs upon the unplowed land, and revolves upon a crank-axle, D. The inner arm of the crank-axle D is rigidly attached to the short arm of the elbow-lever E, which is pivoted at its angle to the frame F in the rear of the axle A, so that the wheel C may always be opposite the wheel B. The long arm of the elbow-lever E passes along the side of the arched bar G, and its upper end projects into such a position that it may be conveniently reached and operated by the driver from his seat. The arched bar G is notched upon its convexed edge to receive the catch-bolt H, which slides in a socket attached to the lever E, and is operated by a small elbow-lever, I, pivoted at its angle to the upper part of the said lever E, so as to hold the wheel C securely in any position into which it may be adjusted.

The frame F is formed of a bar bent into V form, with a rounded angle, placed with its angle forward, and secured near its ends to the end parts of the axle A. To the axle A, near the furrow-wheel B, is rigidly attached the lower end of a short standard, J, to the upper end of which is rigidly attached a short horizontal bar, K, placed longitudinally with the machine. To the opposite sides of the forward end of the bar K are attached the upper ends of two short metallic straps or plates, L, to and between the lower ends of which is pivoted the tongue M by a pin or bolt passing through them and through the said tongue M. To the opposite sides of the rear end of the tongue M are attached the forward ends of two metallic straps or plates, N, the rear ends of which project across the standard J, and slide up and down upon the said standard when the said tongue is being adjusted. To the tongue M is attached the lower end of a curved bar, O, which passes up through a short slot in the horizontal bar K, and has notches formed in its rear or convex side to receive the forward end of a bolt, P, that slides in a keeper attached to the upper side of the said bar K.

The sliding bolt P is moved back and forth to release and fasten the tongue M by a lever, Q, pivoted to a lug formed upon the keeper, in which the said bolt P slides. The bolt P should be drawn back and the tongue M left free when the plow is at work.

To the lower side of the forward part of the frame F are attached two downwardly-projecting parallel plates, R, having holes formed through them to receive a pin, $r'$, to limit the downward movement of the forward end of the plow-beam S, which works freely between the said plates R. The plates R and pin $r'$ keep the plow-beam S in line with the length of the machine, and prevent it from dropping down when the machine is being turned.

To the upper side of the rear part of the plow-beam S, and at the balancing-point of the plow, is hinged the middle part of a bail, T, the ends of which are pivoted to the rear ends of the arms of the frame F.

To the bail T, at a little distance from its center, is rigidly attached the inner end of the arm U, to the outer end of which is pivoted the lower end of a short connecting-rod, V. The upper end of the connecting-rod V is pivoted to the outer end of the arm W, the inner end of which is rigidly attached to the lever X at a little distance from its lower end. The lower end of the lever X is pivoted to the end of the bail T, or to the arm of the frame F, and its upper end projects into such a position that it can be conveniently reached and operated by the driver from his seat. The lever X passes across the arched bar Y, the ends of which are attached to the outer side of the ends of the horizontal bar K.

The edge of the arched bar Y is notched to receive a catch formed upon or attached to the lever X, so as to hold the plow in any position into which it may be adjusted.

Z is the driver's seat, which is attached to the upper end of the spring-standard $z'$. The lower end of the spring-standard $z'$ is attached to the center of the axle A.

With this construction, the driver from his seat can level the frame, fasten and unfasten the tongue, and raise and lower the plow, as circumstances may require.

Having thus described my invention, I claim as new and desire to secure by Letters Patent—

The combination of the centrally-pivoted tongue embracing and sliding on the post J, the curved bar O, having notches formed in its convex side, the sliding bolt P, and the pivoted lever Q with the horizontal bar K, brace L, frame F, and axle A, whereby the tongue may be fixed or freely vibrate in a vertical plane, substantially as shown and described.

DANIEL OSCAR FOSGATE.

Witnesses:
  H. A. ECKHOLDT,
  JOHN NELSON,
  JOHN GUNDERSON.